(12) United States Patent
Abe et al.

(10) Patent No.: US 8,232,794 B2
(45) Date of Patent: Jul. 31, 2012

(54) ROTATION ANGLE DETECTOR

(75) Inventors: Fumihiko Abe, Tokyo (JP); Kengo Tanaka, Tokyo (JP); Dongzhi Jin, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 378 days.

(21) Appl. No.: 12/515,132

(22) PCT Filed: Nov. 16, 2007

(86) PCT No.: PCT/JP2007/072263
§ 371 (c)(1),
(2), (4) Date: Feb. 4, 2010

(87) PCT Pub. No.: WO2008/059951
PCT Pub. Date: May 22, 2008

(65) Prior Publication Data
US 2010/0148764 A1 Jun. 17, 2010

(30) Foreign Application Priority Data

Nov. 17, 2006 (JP) ................. 2006-312100

(51) Int. Cl.
*G01B 7/30* (2006.01)
(52) U.S. Cl. .................................. 324/207.25
(58) Field of Classification Search .............. 324/207.25
See application file for complete search history.

(56) References Cited

U.S. PATENT DOCUMENTS

| 5,528,139 | A | 6/1996 | Oudet et al. |
| 2006/0207310 | A1* | 9/2006 | Kuwata et al. ................. 73/1.37 |

FOREIGN PATENT DOCUMENTS

| JP | 2003075108 | 3/2003 |
| JP | 2005-098761 A | 4/2005 |
| JP | 2006105827 | 4/2006 |
| JP | 2006-220669 A | 8/2006 |
| JP | 2007-093420 A | 4/2007 |

OTHER PUBLICATIONS

European Search Report for 07831993.6 Mailed Apr. 28, 2011.
International Search Report dated Dec. 18, 2007 for PCT Application Serial No. PCT/JP2007/072263, 2 Pages.

* cited by examiner

*Primary Examiner* — Bot Ledynh
(74) *Attorney, Agent, or Firm* — Turocy & Watson, LLP

(57) ABSTRACT

A rotation angle detector for detecting the rotation angle of a rotator to be measured which detects the flux density, generated depending on rotation of the rotator to be measured, of a ring-like magnet fixed to the rotator by means of a magnetic detection element. Since a soft magnetic member is interposed between the ring-like magnet and the rotator, rotation angle of the rotator can be measured accurately without being affected by the material or diameter of the rotator or the fixing state of the rotation angle detector to the rotator. Consequently, a rotation angle detector for detecting the rotation angle of a rotator to be measured accurately without being affected by the material or diameter of the rotator or the fixing state of the rotation angle detector to the rotator is presented.

2 Claims, 7 Drawing Sheets

ROTATION ANGLE DETECTOR

CROSS-REFERENCE TO RELATED APPLICATIONS

This application is a US national stage filing of patent cooperation treaty (PCT) Appln. No. PCT/JP2007/072263 (WO2008/059951), filed Nov. 16, 2007, which claims priority to Japanese patent application No. 2006-312100, filed on Nov. 17, 2006, the entire content of which are incorporated herein by reference.

TECHNICAL FIELD

This invention relates to a rotation angle detector which is fixed to a rotator and is used for detecting rotation angle of the rotator.

BACKGROUND ART

For example, a rotation angle detector for detecting frequency of rotation of a rotating shaft is known (for example, refer to patent document 1). In this rotation angle detector, a magnet which is formed in disk shape is supported with a rotating shaft, and is maintained to be rotatable in the prescribed direction with the rotating shaft as the center. Furthermore, in the rotation angle detector, two magnetic sensors are provided. The two magnetic sensors consist of hall elements which have same heat characteristic each other and are arranged so that the line running through the center of the disk and one magnetic sensor meets the line running through the center of the disk and another magnetic sensor at an angle of 90°. And each magnetic sensor is arranged beneath the circumference of the magnet.

Patent document 1: Japanese Patent Application Publication 2003-75108 (P2-4, FIG. 4, 5)

DISCLOSURE OF INVENTION

Problem to be Solved

However, in the conventional rotation angle detector described above, since the magnet is integrated with the rotating shaft, such a rotation angle detector is not appropriate for being fixed to, for example, a steering shaft of vehicle and for measuring the steerage angle. Specifically, the rotation angle detector described above has such a configuration that the steering shaft cannot be inserted into the rotation angle detector itself, and if the rotation angle detector is forcibly fixed to the steering shaft, since it is need to be fixed to the edge of the steering shaft (fixing part of a steering wheel), location to be fixed is limited.

To solve these problems, for example, a rotation angle detector described in Japanese Patent Application Publication 2006-105827 is disclosed. The rotation angle detector includes ring shaped magnet into which the steering shaft of the vehicle is inserted so that the problem described above can be avoided. However, such a rotation angle detector has detection principle that the variation of the magnetic flux density is detected and, for example, in the case that the steering shaft made from iron is inserted into the ring shaped magnet of the rotation angle detector, the magnetic circuit passes through the steering shaft made from iron, and, namely, there has been a problem that difference from the magnetic circuit of the magnet in the simple sensor is caused. Furthermore, there has been a problem that, when the steering shaft is fixed to the rotation angle detector, the way of formation of magnetic circuit around the magnet deviates because of difference of the spec, material and diameter of the shaft, and/or dispersion of gap between the axes of rotation angle detector.

FIG. 7 schematically shows the magnetic flux distribution of the magnet when this shaft is fixed to the rotation angle detector 5. In the same figure, the shaft S is inserted into the ring shaped magnet 50 so that the magnet 50 is integrally rotated together with the shaft S by the spacer 55 made from non-magnetic material which is provided on inner side of the magnet 50. And the magnetic flux density of the magnetic circuit (refer to the arrows of lateral ellipse in the figure) of the magnet 50 is detected by the hall elements 40 mounted on the substrate 30. As obvious from the same figure, a part of the magnetic circuit passes through the shaft S. And way of formation of the magnetic circuit is changed by difference of the material and diameter of the shaft S, and/or gap between the axes of the magnet 50 and shaft S. Namely, stable magnetic circuit of magnet is not unambiguously formed because of the material and diameter of the shaft S and relative locations of the shaft S and the rotation angle detector 5, and, therefore, dispersion of the output of the hall element is caused. In general, an assembly plant for assembling the rotation angle detector 5 is apart from a vehicle assembly plant where the rotation angle detector 5 is fixed to the steering shaft S of vehicle, and the hall elements 40 can hardly be calibrated (corrected) in advance in expectation of the dispersion in formation of magnetic circuit caused by the steering shaft S.

The purpose of this invention is to provide a rotation angle detector with which rotation angle of rotator to be measured is accurately measured without effect of material, size and fixing status of a rotator to be measured.

Means to Solve the Problem

To solve the problems described above, the rotation angle detector according to the present invention is the rotation angle detector for detecting rotation angle of a rotator to be measured, in which magnetic flux density generated by a ring shaped magnet fixed to the rotator to be measured generated accompanied by rotation of the rotator to be measured is detected, wherein soft magnetic material is provided between the ring shaped magnet and the rotator to be measured.

According to the configuration of the present invention, since magnetic circuit generated by the magnet can be stabilized by soft magnetic material, rotation angle of the rotator to be measured can be accurately measured regardless of material, size of diameter and fixing status of the rotation angle detector to the rotator to be measured.

Furthermore, a rotation angle detector of the present invention is provided wherein the soft magnetic material is fixed to inner side of the ring shaped magnet.

Since, in use of the magnet which has such a configuration, the magnetic circuit generated by the magnet can be stabilized by the soft magnetic material, the rotation angle of the rotator to be measured can be accurately measured regardless of material, size of diameter and fixing status of the rotation angle detector to the rotator to be measured. Furthermore, since the soft magnetic material is integrally formed with the magnet on inner side of the magnet, there cannot be clearance between the soft magnetic material and the magnet, the magnetic circuit can be stably formed, and detection accuracy of the rotation angle detector can be improved.

DESCRIPTION OF THE PREFERRED EMBODIMENT

Figure 1:
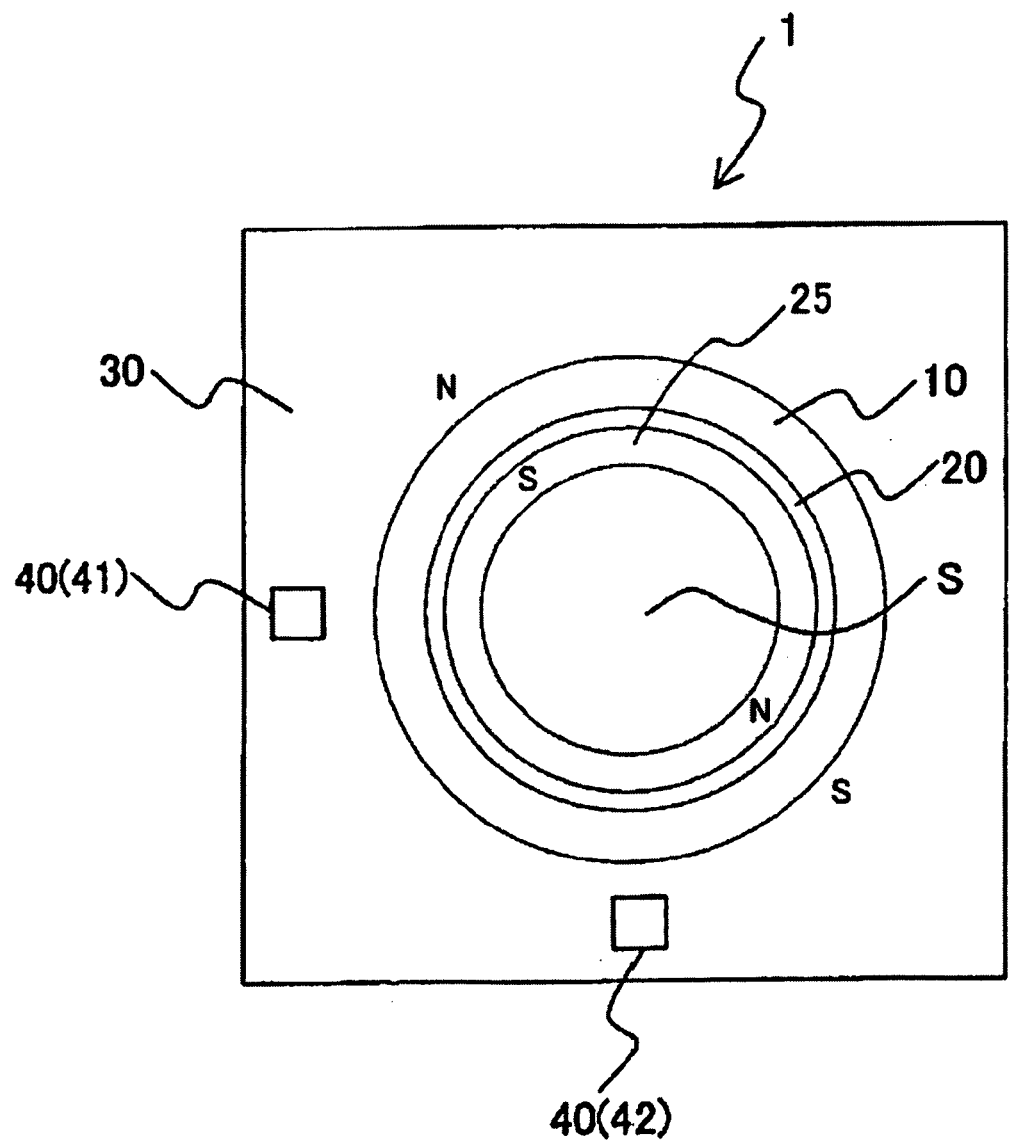
FIG. 1 is a plan view of the schematic configuration inside the rotation angle detector according to the present invention.

The rotation angle detector 1 according to one embodiment of the present invention is explained below as based on the figures. The explanation is made on the case that, in a steering device of automobile, the rotation angle detector is fixed to a steering shaft (described as Shaft S below) as a rotator to be measured, and rotation angle of a handle is detected.

The rotation angle detector 1 according to one embodiment of the present invention includes a ring shaped magnet, a ring shaped yoke 20 which is provided on inner side of the ring shaped magnet 10, a substrate 30 for supporting the magnet 10 and the yoke 20 integrally so as to be rotatable, and two hall elements 40 (41, 42) arranged in outer side of the ring shaped magnet 10 to meet at center of the ring shaped magnet 10 at an angle of 90° and respectively have same distance from the center each other.

In the ring shaped magnet 10, one edge part in the circle direction is formed with outer side as North Pole and with inner side as South Pole, and another edge part in the circle direction is formed with outer side as South Pole and with inner side as North Pole. And the forming areas of North Pole and South Pole are gradually exchanged in the radius direction between one edge part and another edge part.

The yoke 20 is made from soft magnetic material, for example, plastic magnet, and the yoke 20 and the magnet 10 are integrally formed at the time of production so as not to have clearance (hollow part) between them.

The yoke 20 can be made from any material, as far as the material is soft magnetic material and, for example, iron or stainless steel can be applicable, however, the higher the relative permeability of the material is, the more preferable it is. The yoke 20 is provided on whole inner peripheral face of the ring shaped magnet 10 and, since the yoke 20 is provided like this, the magnetic circuit is formed so that magnetic flux generated by the magnet 10 passes through the inside of the yoke (refer to the arrows of lateral ellipse in FIG. 3). And the magnet 10 and the yoke 20 are integrated as described above.

In the fixing mechanism for fixing the magnet 10 and the yoke 20 to the shaft S, for example, the ring shaped spacer 25 made from non-magnetic material (for example, synthetic resin) is provided on the inner side of the yoke 20. And, for example, a non-depicted serration is formed on the inner side of the ring shaped spacer 25 so as to be engaged to the non-depicted serration of the shaft S. And, for example, the shaft S of automobile is inserted into the inner side of the yoke 20, and the magnet 10 and the yoke 20 are integrally rotated by the spacer 25 made from non-magnetic material, which is fixed to the inner side of the yoke 20, accompanied by rotation of the shaft S. The magnet 10 and the yoke 20 are fixed to the ring shaped spacer 25 or a rotor (not depicted in the figure) which is integrated with the ring shaped spacer 25. And the ring shaped spacer 25 or the rotor (not depicted in the figure) which is integrated with the ring shaped spacer 25, is rotatably supported with bearings which do not affect the magnetic circuit, on the substrate 30 or in the case (not depicted in the figure) to which the substrate 30 is fixed As described above, the substrate 30, the magnet 10 and the yoke 20 are received in the case which is made from the material intercepting the magnetic flux from the outside, to which the substrate 30 is maintained to be fixed and also the magnet 10, the yoke 20 and the spacer 25 are rotatably supported, and which can be fixed, for example, with non-depicted brackets or the like to a part different from the shaft S.

Figure 2:
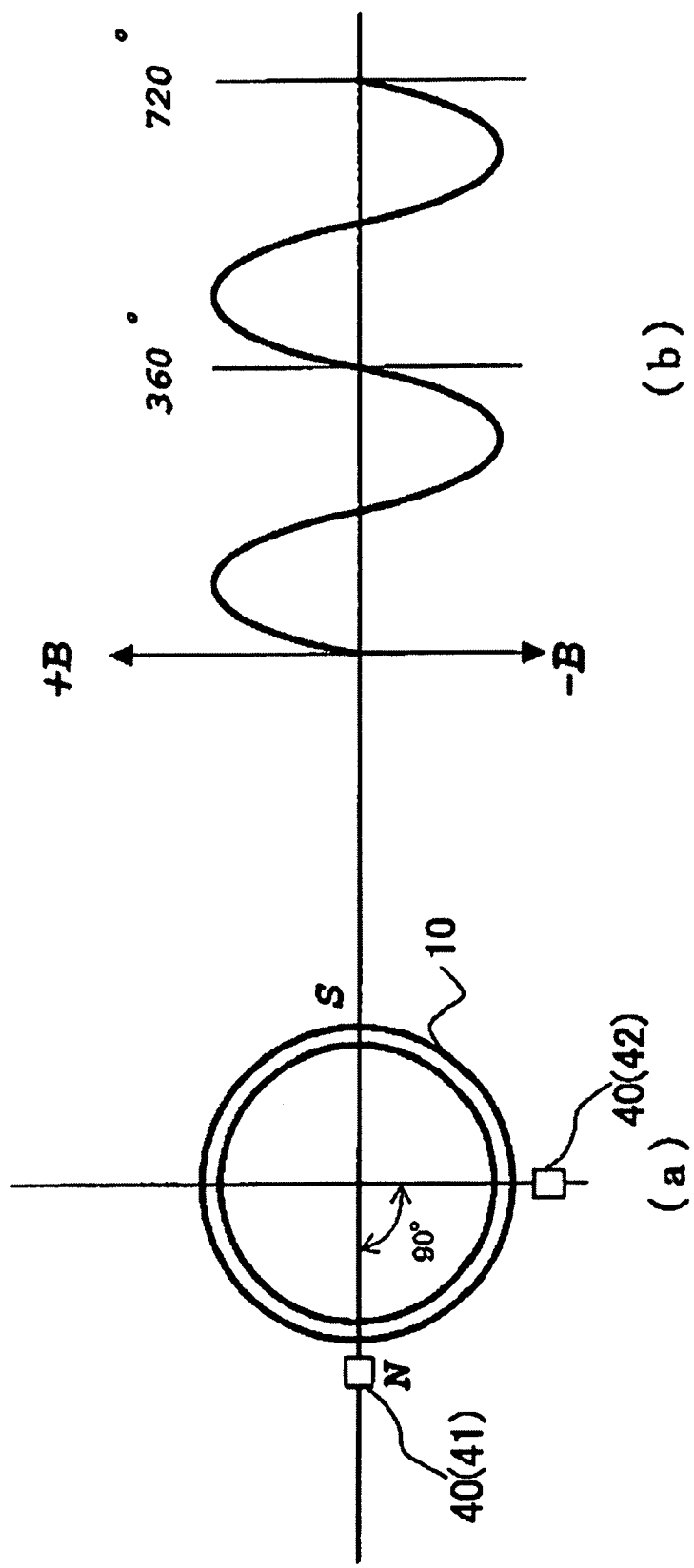
FIG. 2 shows arrangement of the hall elements of the rotation angle detector shown in FIG. 1 (FIG. 2 (a)) and diagram of the output characteristic with rotation angle of the shaft obtained from the hall element as horizontal axis and with magnetic flux density as vertical axis (FIG. 2 (b)).

As described above, on the substrate 30, the two hall elements 40 (41, 42) are provided so that the rotation of the shaft S, namely, variation of the magnetic flux density caused by the rotation of the magnet 10 is detected by the two hall elements 40 (41, 42) respectively. As shown in FIG. 2, in the detecting principle, there is utilized that, for example, one hall element shown in left side of FIG. 2 (a) has the output characteristic shown in FIG. 2 (b). In FIG. 2 (b), shaft S, namely, the rotation angle of the magnet 10 is shown in horizontal axis and the magnetic flux density of the magnet 10 is shown in vertical axis. As seen in FIG. 2 (b), the output characteristic of one hall element 41 shows sin wave (sinusoidal wave).

It is not depicted in the figure that the hall element 42 which is arranged in lower side in FIG. 2 (b) has the output characteristic which shows sinusoidal wave shown in FIG. 2 (b), however, because of the arranging position of both hall elements 41, 42 on the substrate, the phase of the output characteristic of the hall element 42 is shifted from the output characteristic of the hall element 41 shown in FIG. 2 (b) by an angle of 90°. And when the outputs of the hall elements whose phases are shifted by an angle of 90° are denoted by X, Y, output which has a saw blade shape output can be obtained from $\tan^{-1}(X/Y)$, accordingly, the rotation angle in 360° cycle is accurately detected.

Figure 3:
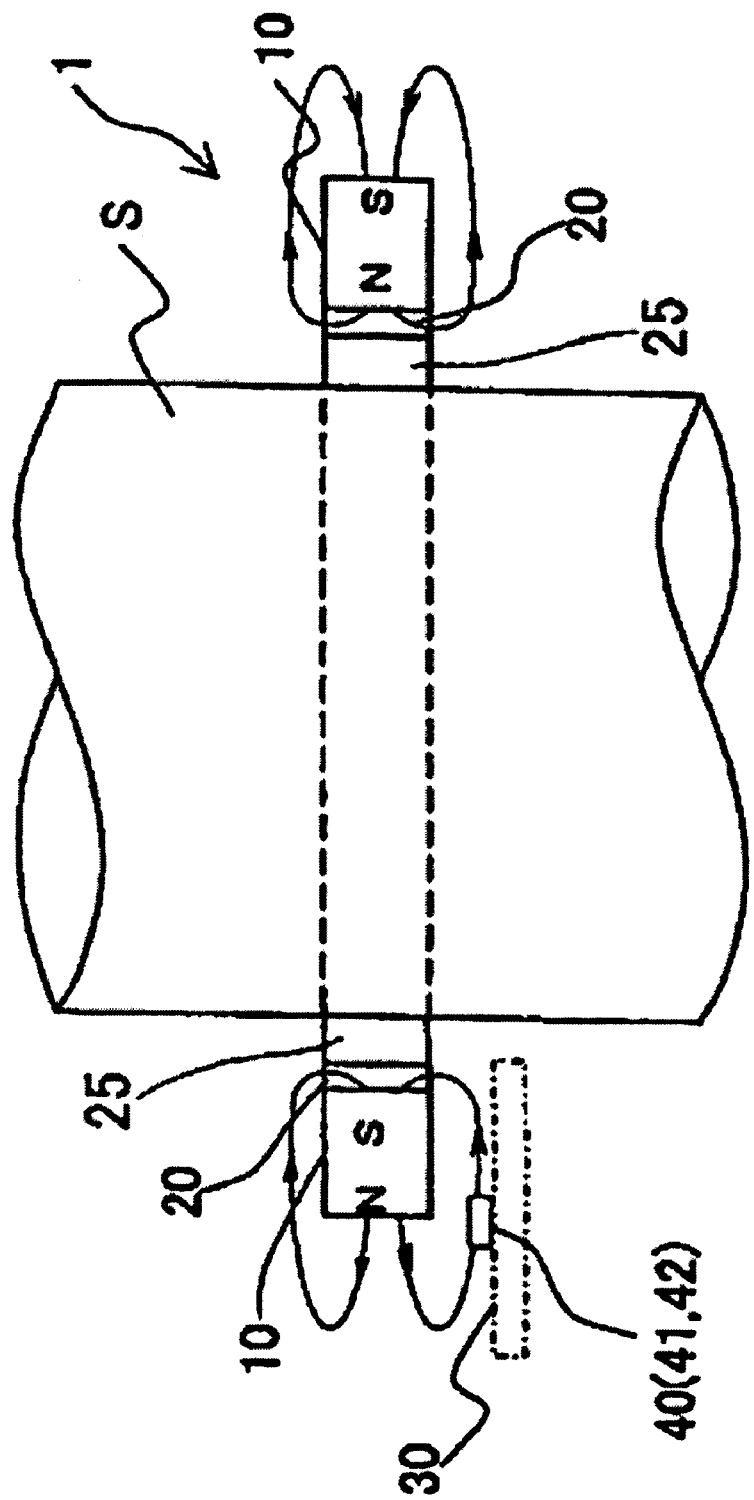
FIG. 3 is schematic side view of fixing status of the rotation angle detector shown in FIG. 1 to the shaft, shown with the magnetic circuit of the magnet in which hatching in sectional part of each component is omitted.

Then, the function according to the present invention is explained. In the rotation angle detector 1 according to the present invention, the rotation angle of the shaft S is detected by the principle described above, and, since the yoke 20 is provided, the inner side (shaft side) of the magnetic flux of the magnetic circuit is formed so as to pass through the inside of the yoke 20 as shown in FIG. 3, and a part of the magnetic circuit is prevented from reaching to the shaft S differently from the prior art shown in FIG. 7.

Figure 7:
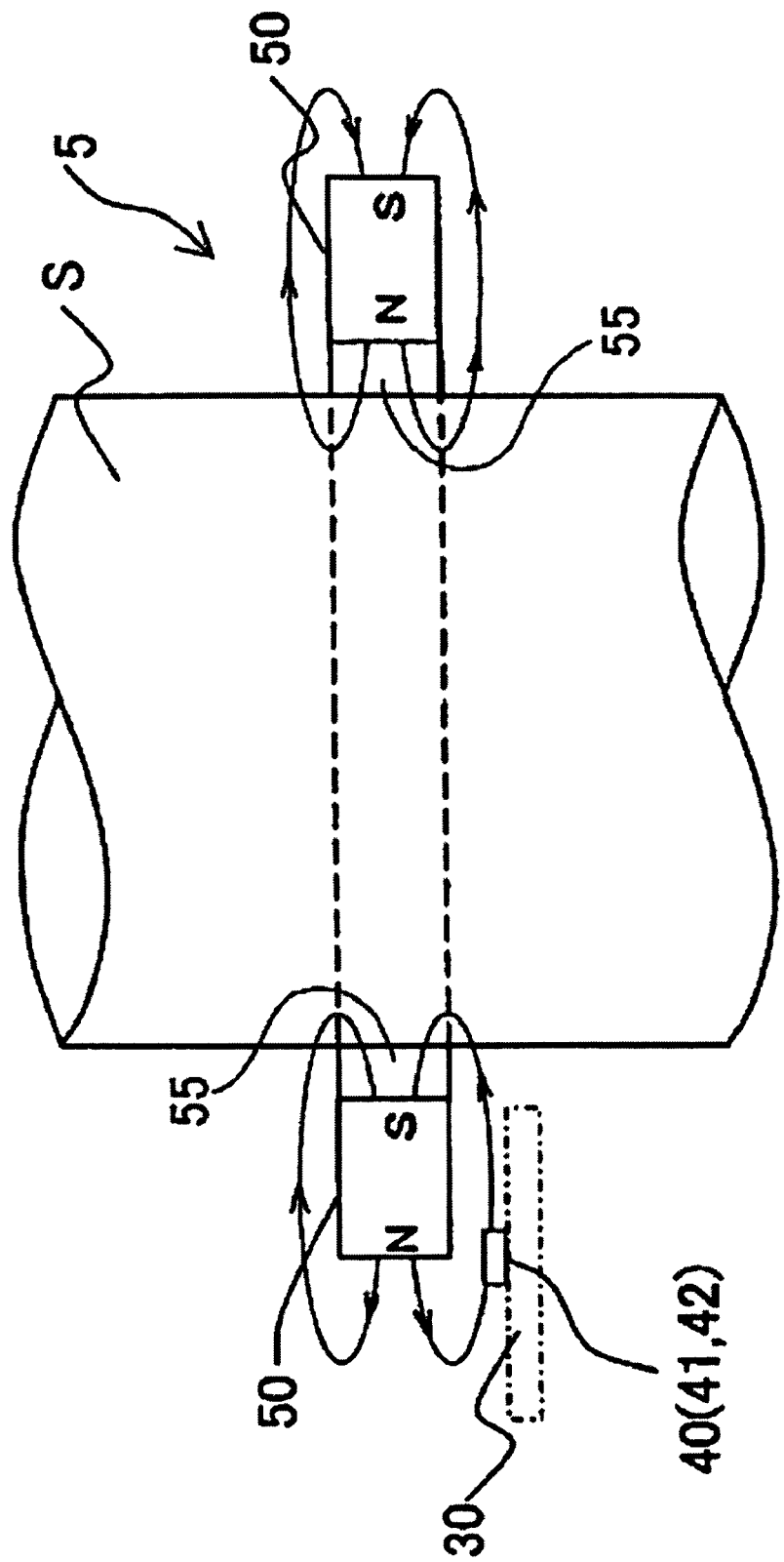
FIG. 7 is schematic side view of fixing status of the conventional rotation angle detector to the shaft corresponding to FIG. 3.

In FIG. 7, the magnetic circuit of the magnet 50 is relatively changed by size of diameter of the shaft S, material of the shaft S and relative positions to which the shaft S and the rotation angle detector 5 are fixed, and, accordingly, dispersion of the output of the hall elements 40 is caused, however, in the present invention, since a part of the magnetic circuit is prevented from reaching to the shaft S side as shown in FIG. 2 even when any sort of shaft S is fixed to the rotation angle detector 1, the magnetic circuit is stably formed around the magnet 10.

Namely, the magnetic circuit can be stably formed around the magnet of the rotation angle detector 1 regardless of the thickness and material of the shaft S and the relative positions to which the shaft S and the rotation angle detector 5 are fixed, and, as a result, the output characteristic can be stably obtained by the hall elements 40.

In the case that the shaft S consists of steering shaft of automobile, since an assembly plant of the rotation angle detector is apart from a vehicle assembly plant where the rotation angle detector 5 is fixed to the shaft S, and the rotation angle detector needs to be produced without the shaft S, dispersion of the output characteristic affected by the shaft S cannot be calibrated, however, since this kind of yoke is provided in the rotation angle detector, dispersion of the output characteristic of the hall elements cannot be caused even if the rotation angle detector is fixed to the shaft S after the rotation angle detector is assembled without the shaft S, and any calibration needs not to be done when the simple rotation angle detector is assembled.

Figure 4:
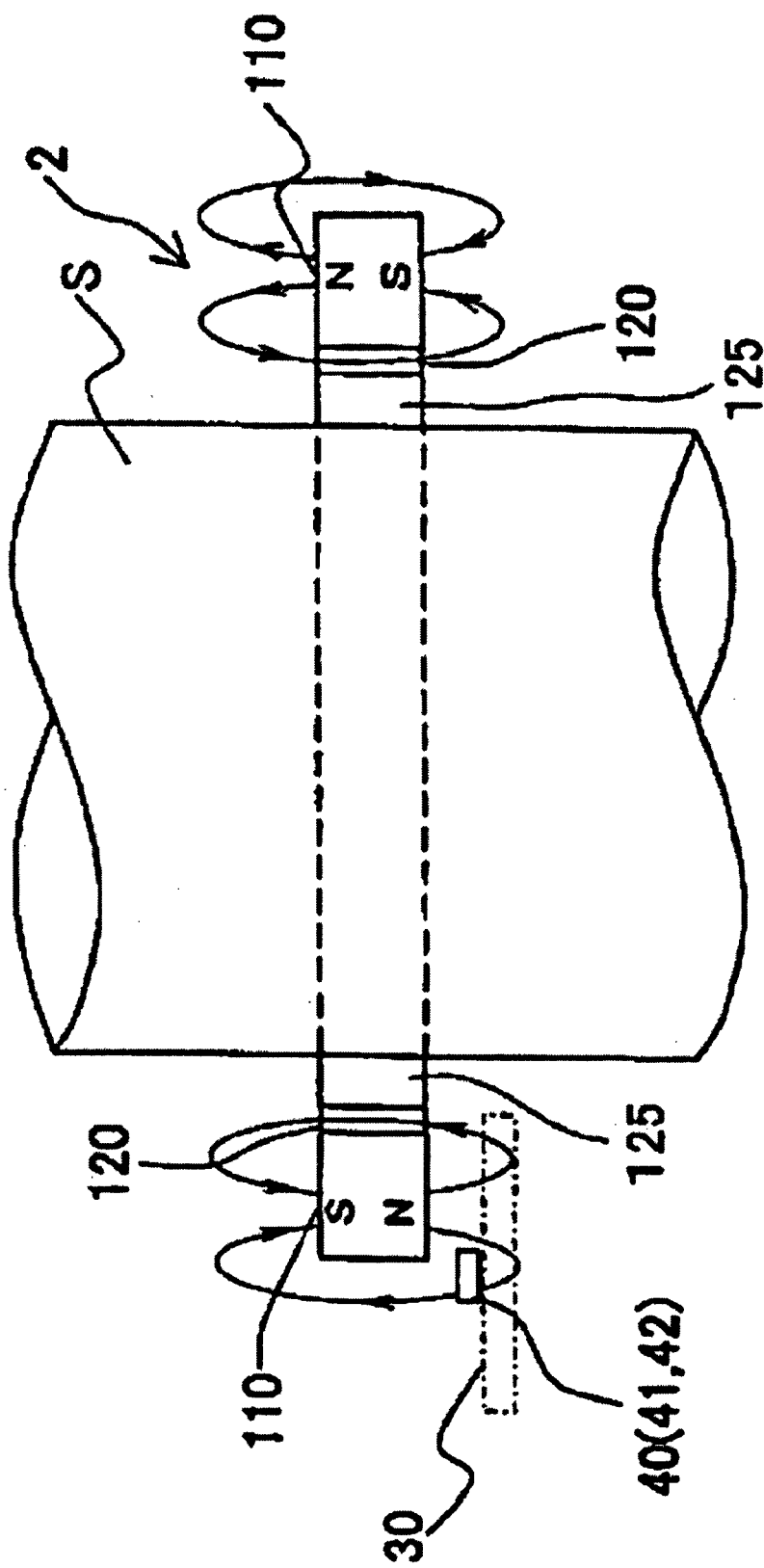
FIG. 4 shows the variant example of the rotation angle detector shown in FIG. 1 as corresponding to FIG. 3.

FIG. 4 shows the variant example of the embodiment described above which is different from the embodiment of the rotation angle detector 2 described above only in the configuration of the magnet 110. Namely, the yoke 120 provided on the inner side of the magnet 110, the material and shape of the yoke 120 and ring shaped spacer 125 provided on the inner side of the yoke 120 are similar to the embodiment described above. Although, in the ring shaped magnet 10 described above, North Pole and South Pole are respectively formed on the outer side and inner side of one edge in the circle direction, and South Pole and North Pole are respectively formed on the outer side and inner side of another edge (opposite edge to one edge in the diameter direction), in the configuration of the ring shaped magnet 110, North Pole and South Pole are respectively formed on upper side (one side of the magnet 110 in the axis direction) and lower side (another edge of the magnet 110 in the axis direction) of one edge, and South Pole and North Pole are respectively formed on upper side and lower side of another edge in the circle direction. And forming area of North Pole and South Pole are gradually exchanged upside down between one edge and another edge. And, since the hall elements or substrate or the like, the supporting mechanism of the magnet and yoke on the substrate, and the fixing mechanism of the magnet and yoke to the shaft in the rotation angle detector are similar to the rotation angle detector 1 described above, their detailed explanations are omitted.

Even if the rotation angle detector 2 has such a configuration, since the magnetic circuit of the magnet in the rotation angle detector 2 denoted with arrows of longitudinal ellipse is prevented from reaching to the shaft S by the yoke, function effect similar to the function described above can be obtained.

Figure 5:
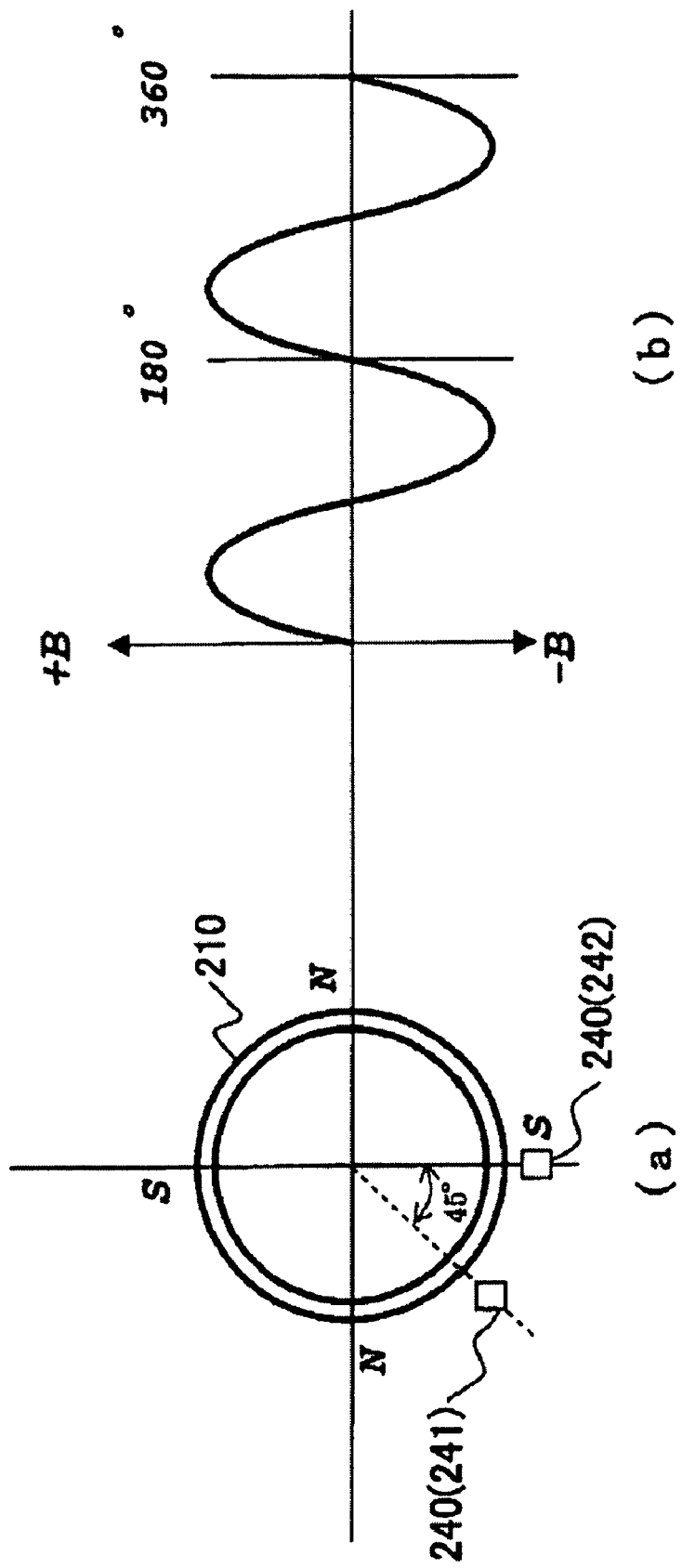
FIG. 5 shows arrangement of the hall elements of the rotation angle detector shown in FIG. 4 (FIG. 5 (a)), and diagram of the output characteristic with rotation angle of the shaft obtained from the hall element as horizontal axis and with magnetic flux density as vertical axis (FIG. 5 (b)).
Figure 6:
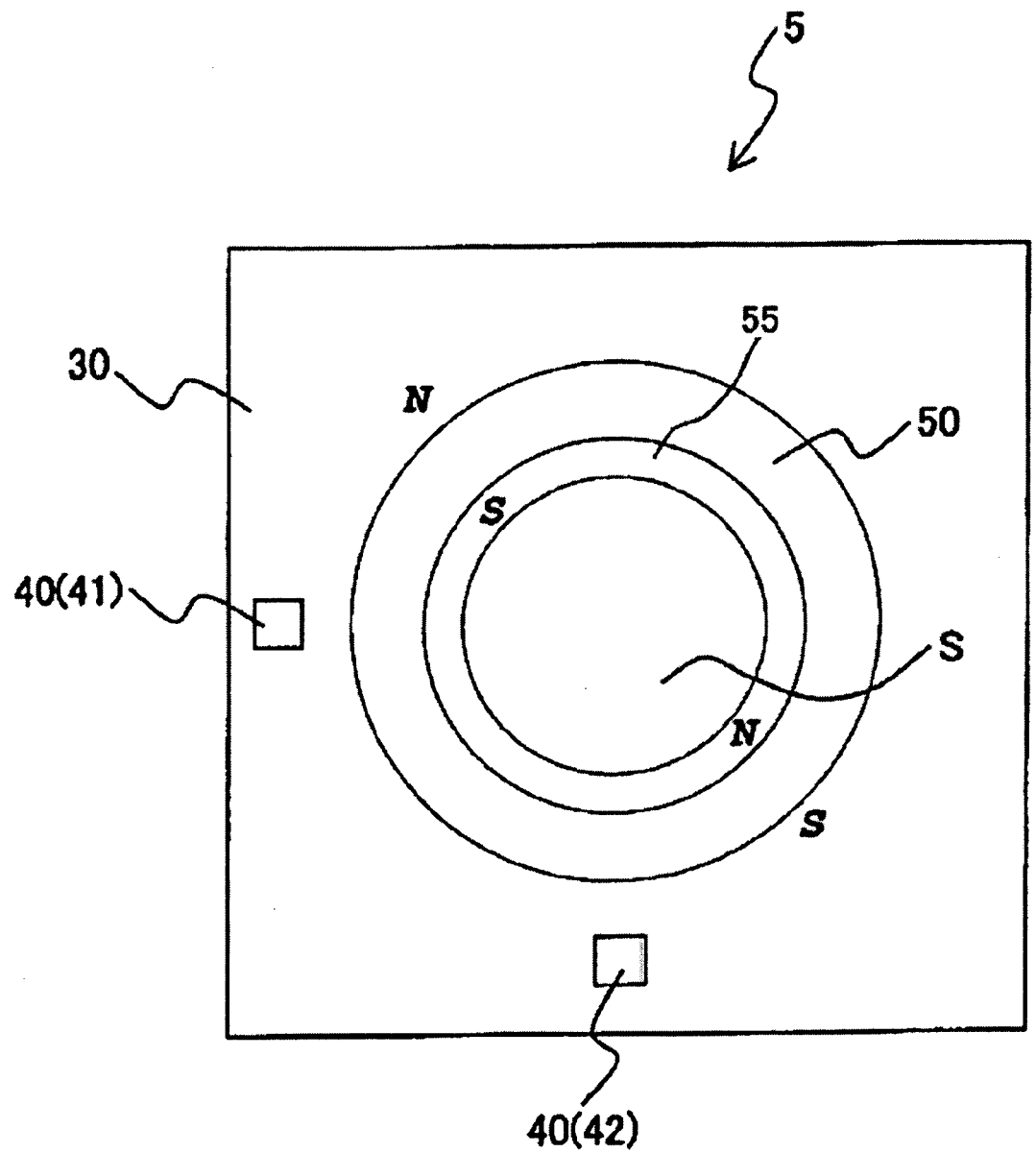
FIG. 6 is a plan view of the schematic configuration inside the conventional rotation angle detector corresponding to FIG. 1.

FIG. 5 shows another variant example of the embodiment described above, and the magnet 210 is different from the embodiment described above in which North Pole and South Pole of the outer side of the magnet are exchanged twice in one lap of the magnet in the circle direction. In such a case, hall elements 240 (241, 242) are fixed to the substrate so that the lines from the hall elements 240 (241, 242) meet at the center axis of the magnet at an angle of 45°. The output characteristic of one hall element 241 is shown FIG. 5 (b). In this case, output of one hall element 241 is repeated in 180° cycle and output of another hall element 242 is also repeated in 180° cycle.

Although, in the embodiment described above, the yoke (soft magnetic material) is integrally provided on inner side of the magnet, it is not limited to this and the soft magnetic material is integrally provided on the shaft side so that magnetic circuit formed by the magnet passes through only the soft magnetic material and the shaft or the like, for example, made from iron is prevented from affecting the magnetic circuit of the magnet.

The rotation angle detector according to the present invention is especially suitable for rotation angle detection of steering device for vehicle which requires high accuracy of rotation angle detection and partially needs to allow deviation of parts or instability of assembling status caused by the assembly plant. And, for example, in the case that the plant where the rotation angle detector itself is assembled and the plant where the rotation angle detector is fixed to the rotator to be measured, are apart from each other, it is especially suitable for stabilization of detecting accuracy of the rotation angle detector. However, the rotation angle detector according to the present invention is applicable to any device which the relative rotation angle or rotation torque of the rotation axes which rotates with vibration is required, for example, robot arm or the like.

What is claimed is:

1. A rotation angle detector for detecting rotation angle of a rotator to be measured, in which magnetic flux density generated by a ring shaped magnet fixed to said rotator to be measured which is generated in response to rotation of said rotator to be measured is detected;

wherein soft magnetic material is provided between said ring shaped magnet and said rotator to be measured; wherein, at one edge part of the ring shaped magnet, the outer side of the ring shaped magnet is a north pole and the inner side of the ring shaped magnet is a south pole, at another edge part of the ring shaped magnet, the outer side of the ring shaped magnet is a south pole and the inner side of the ring shaped magnet is a north pole, wherein, between the one edge part and the other edge part, the forming areas of north pole and south pole of the ring shaped magnet are gradually exchanged in radius direction between the one edge part and the other edge part, and wherein, the variation of the magnetic flux density caused by rotation of the ring shaped magnet is detected and the output characteristic of the detection is a sinusoidal wave related to the rotation angle of the ring shaped magnet.

2. The rotation angle detector according to claim 1, wherein said soft magnetic material is fixed to inner side of said ring shaped magnet.

* * * * *